United States Patent

Robertson

[15] 3,656,485

[45] Apr. 18, 1972

[54] METHOD OF AND APPARATUS FOR VIEWING THE INTERIOR OF THE BLADDER THROUGH A SUPRAPUBIC INCISION

[72] Inventor: Jack R. Robertson, 1451 Refugio Road, Santa Ynez, Calif. 93460

[22] Filed: Apr. 27, 1970

[21] Appl. No.: 32,028

[52] U.S. Cl. ..................128/349 R, 128/8, 128/305
[51] Int. Cl. ..........................................A61m 25/00
[58] Field of Search ..................128/3–8, 303, 305, 128/311, 328, 341, 343, 348, 349 R, 349 B, 349 BV, 350 R, 350 V, 351, 347

[56] References Cited

UNITED STATES PATENTS

| | | | |
|---|---|---|---|
| 2,256,942 | 9/1941 | Duffy | 128/350 R |
| 2,583,937 | 1/1952 | Fossati | 128/4 |
| 3,402,710 | 9/1968 | Paleschuck | 128/348 X |
| 3,137,298 | 6/1964 | Glassman | 128/328 |
| 3,467,102 | 9/1969 | Fogarty et al. | 128/348 |

FOREIGN PATENTS OR APPLICATIONS

| | | | |
|---|---|---|---|
| 126,844 | 6/1918 | Great Britain | 128/7 |
| 1,102,994 | 2/1968 | Great Britain | 128/347 |
| 1,161,436 | 8/1969 | Great Britain | 128/348 |

Primary Examiner—Dalton L. Truluck
Attorney—Harris, Kiech, Russell & Kern

[57] ABSTRACT

A method of and an instrument for locating a suprapubic incision into the bladder and for inserting a viewing unit through the incision into the bladder. A telescope for viewing the interior of the bladder is insertable thereinto through the viewing unit. The viewing unit may be left in place for later viewing of the interior of the bladder therethrough, and may be sutured to the abdominal wall. Also, a retention catheter may be inserted into the bladder through the viewing unit.

The insertion instrument is elongated and terminates in a curved distal portion insertable through the urethra into the bladder to bring the distal end of the instrument into engagement with the anterior wall of the bladder in register with the suprapubic area of the abdominal wall. The instrument is provided with a longitudinal passage therethrough from its proximal end to a point adjacent but spaced from its distal end, and has a lateral opening therein at the distal end of the passage. With the distal end of the instrument in engagement with the anterior wall of the bladder, the bladder is inflated with a suitable fluid through the passage and the lateral opening in the instrument. Then, the aforementioned incision is made through the abdominal wall and the anterior wall of the bladder in register with the distal end of the instrument. The distal end of the viewing unit is then connected to the distal end of the insertion instrument, and the distal ends of these devices are then inserted into the bladder through the incision. Subsequently, the distal end of the viewing unit within the bladder, and the insertion instrument is then withdrawn through the urethra, leaving the viewing unit in place for insertion of a telescope therethrough for viewing the interior of the bladder.

6 Claims, 15 Drawing Figures

PATENTED APR 18 1972 3,656,485
SHEET 1 OF 2
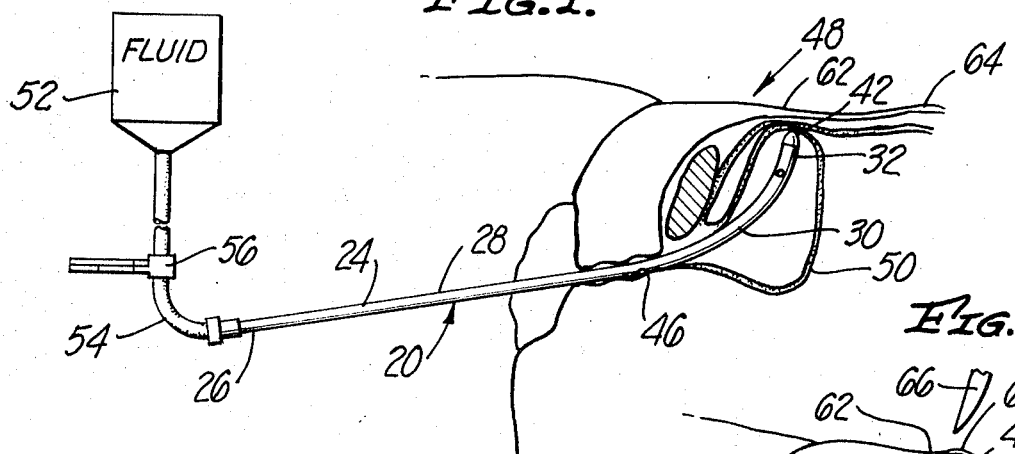
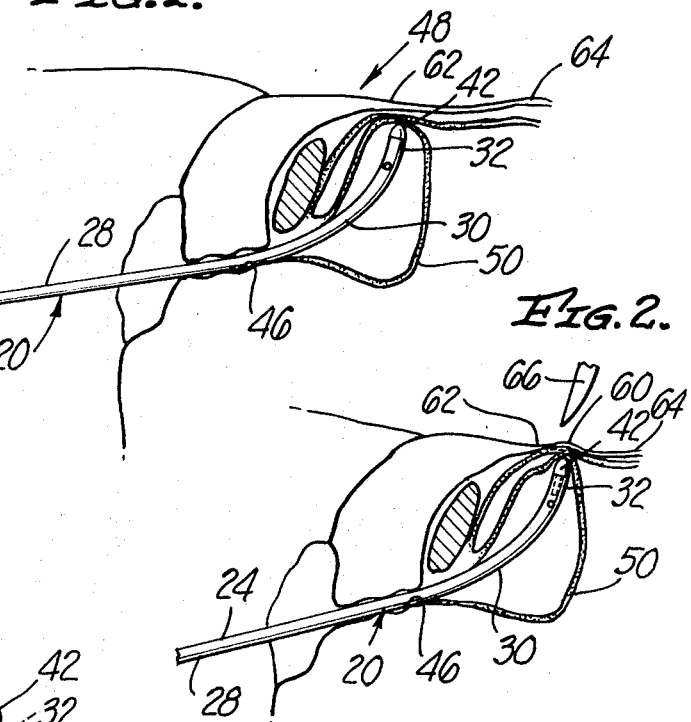
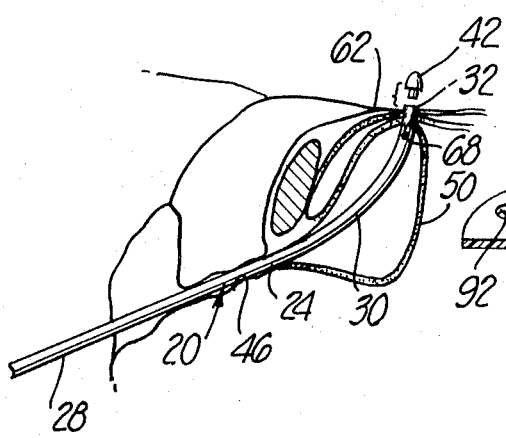
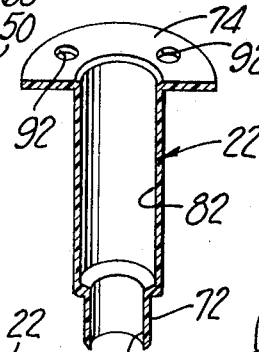
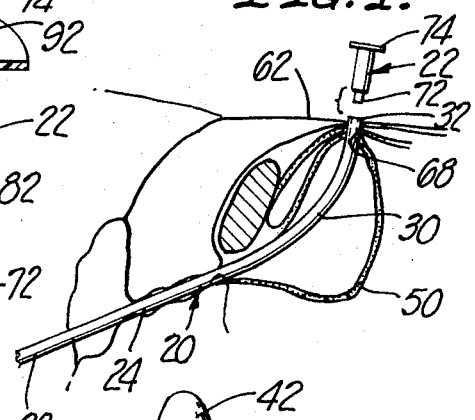
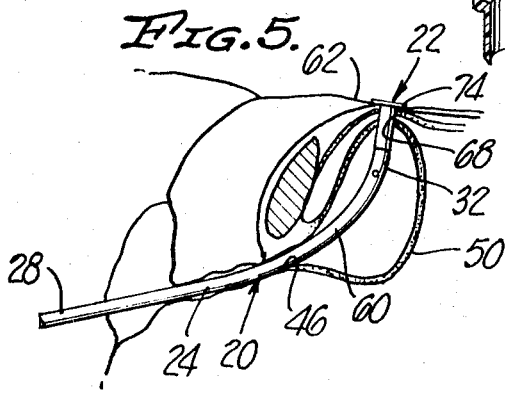
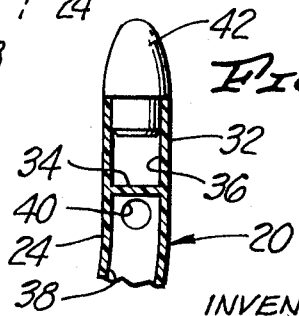
INVENTOR
JACK R. ROBERTSON
BY HIS ATTORNEYS
HARRIS, KIECH, RUSSELL & KERN

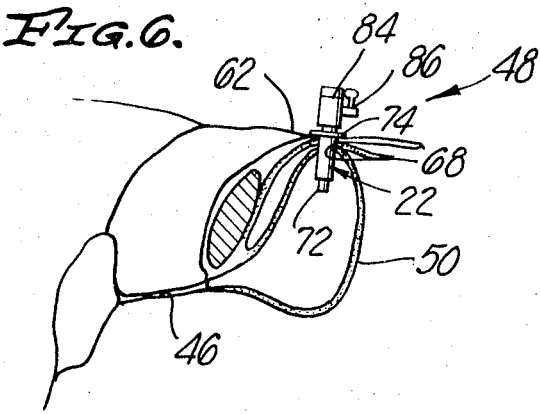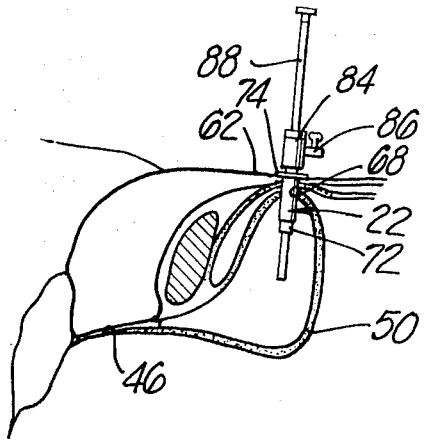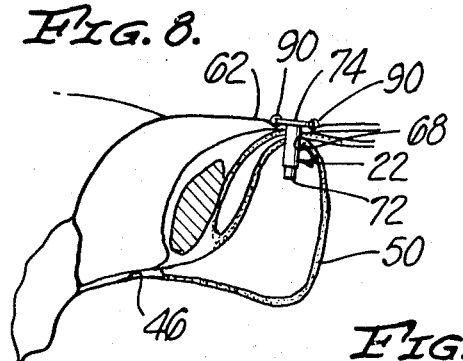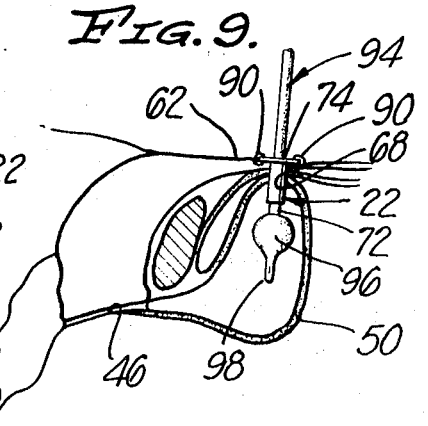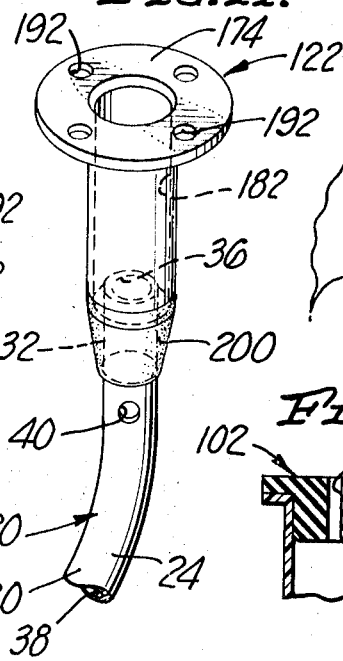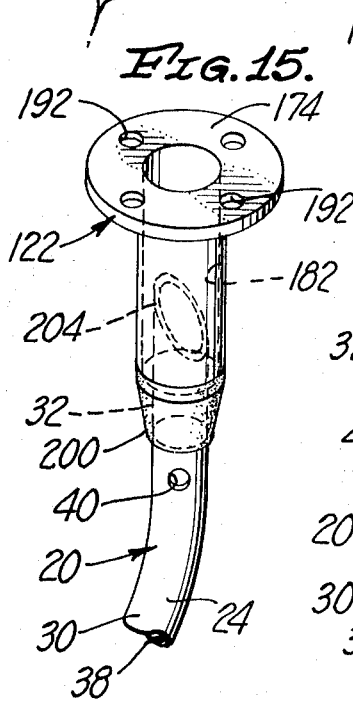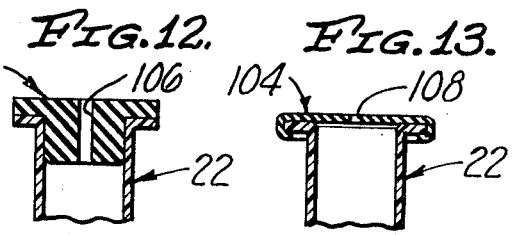

METHOD OF AND APPARATUS FOR VIEWING THE INTERIOR OF THE BLADDER THROUGH A SUPRAPUBIC INCISION

CROSS REFERENCE TO RELATED APPLICATIONS

This application is related to my copending applications Ser. No. 297, filed Jan. 2, 1970, and Ser. No. 26,727, filed Apr. 8, 1970, and directed to a method of and an instrument for inserting a suprapubic catheter. Since the present application and the copending applications mentioned have various features in common, the disclosures of the copending applications are incorporated herein by reference.

BACKGROUND OF THE INVENTION

The present invention relates in general to viewing the interior of a body cavity, and particularly the interior of the bladder. The term "viewing," as used herein, refers not only to direct visual observation, but to photographing the interior of the bladder if a permanent record is desired.

Conventionally, the interior of the bladder is viewed through a cystoscope inserted through the urethra into the bladder. Such an instrument is of limited utility since it cannot be used for repeated observations without causing excessive urethral trauma, it cannot be used to view the interior of the bladder while it is functioning normally, and the like.

SUMMARY AND OBJECTS OF INVENTION

Generally speaking, the primary object of the present invention is to provide a method of and an apparatus for viewing the interior of the bladder which involves viewing through an extraperitoneal suprapubic incision in the anterior wall of the bladder and the overlying abdominal wall.

More particularly, an important object of the invention is to provide a viewing or window unit which is insertable into the bladder through the suprapubic incision and which is of a size to permit insertion of a relatively large conventional telescope therethrough into the bladder.

The foregoing general technique, utilizing a window of the nature indicated, has important advantages. First of all, it permits repeated observations of the interior of the bladder without trauma to the urethra. Such repeated observations may be desirable or necessary in the treatment of various conditions, such as a bladder tumor, for example, following bladder surgery, and the like.

Secondly, the present invention permits observation of the interior of the bladder while the bladder is functioning substantially normally. Thus, not only can the physician observe the flow of urine into the bladder from the ureters, but he can also observe the functioning of the urethrovesical junction under substantially normal conditions. This is particularly important to determine whether sutures have been placed properly in surgery to tighten the urethrovesical junction in the treatment of stress incontinence. Also, the physician can observe the action of the bladder while taking a cystometogram, which is an important feature.

These and various other significant advantages are attributable to the general viewing technique and window unit of the invention.

Considering the invention more specifically now, another object thereof is to provide such a tubular viewing unit having at its proximal end a flange, preferably an annular flange, which seats against the exterior of the abdominal wall to limit insertion.

A further object is to provide the flange at the proximal end of the tubular viewing unit with openings by means of which the unit may be sutured to the abdominal wall if it is to be left in place for repeated viewing of the interior of the bladder. If the viewing unit is to be left in place, and the use of a catheter is indicated, a suitable retention catheter, such as a Foley catheter, may be inserted into the bladder through the viewing unit and inflated within the bladder to retain the catheter. If later observation of the interior of the bladder is desired, the catheter may be removed, and a telescope inserted through the viewing unit.

Yet another object is to provide the viewing unit at its proximal end with sealing means for providing a fluid tight seal around a catheter, or other device extending through the viewing unit into the bladder.

Another important object of the invention is to provide a technique of locating and making the suprapubic incision, and of inserting the tubular viewing unit, which is substantially the same as the technique disclosed and claimed in my aforementioned copending application.

More particularly, an important object in this connection is to employ an instrument which may be inserted through the urethra into the bladder and which is provided with a curved distal portion terminating in a distal end engageable with the anterior wall of the bladder with a light pressure to cause the overlying abdominal wall in the suprapubic area to protrude slightly, thereby positively locating the point at which the desired suprapubic incision should be made so as to avoid the risk inherent in making a blind puncture.

A further object of the invention is to provide the incision locating instrument with a longitudinal passage extending from its proximal end to a point adjacent but spaced from its distal end and terminating in one or more lateral openings. With this construction, a fluid, such as water, may be introduced into the bladder through the passage and the lateral openings in the instrument to inflate the bladder prior to locating and making the suprapubic incision.

Still another important object of the invention is to provide the distal end of the incision locating instrument and the distal end of the tubular viewing unit with means for interconnecting them in any suitable manner, with the distal end of the instrument projecting outwardly through the incision, so that the instrument can be used to guide the viewing unit into the bladder through the incision, which is an important feature. Subsequently, the incision locating and viewing-unit-inserting instrument is disconnected from the viewing unit within the bladder, and is withdrawn through the urethra, leaving the viewing unit in place, which is another important feature. In this connection, any of the instruments disclosed in my aforementioned copending application Ser. No. 27,727 may be used.

An additional object is to provide a tubular viewing unit and a locating and insertion instrument the distal ends of which are telescopically connectible so that they can be connected quickly and easily externally of the body when the distal end of the instrument projects through the incision, and which can be disconnected readily within the bladder after the instrument has been used to insert the viewing unit.

Yet another object is to provide a construction wherein the distal end of the instrument is telescopically insertable into the distal end of the viewing unit.

A further object is to provide a viewing unit and insertion instrument combination wherein the distal end of the viewing unit is telescopically insertable into the distal end of the instrument. In this case, the distal end of the instrument is tubular and may be provided with a removable tapered closure or tip which can be removed, after outward passage through the incision, to admit the distal end of the viewing unit into the distal end of the instrument. Alternatively, the distal end of the instrument may comprise simply an open socket capable of receiving the distal end of the viewing unit.

Yet another important object of the invention is to provide a tubular viewing unit the proximal end of which is adapted to accomodate a fitting through which the telescope extends and which is provided with a stop cock, or the like, for admitting fluid into the bladder through an annulus between the telescope and the viewing unit, if such fluid is desired during observation of the interior of the bladder.

The foregoing objects, advantages, features and results of the present invention, together with various other objects, advantages, features and results thereof which will be evident to those skilled in the art in the light of this disclosure, may be

DESCRIPTION OF DRAWINGS

In the drawings:

FIGS. 1 to 5 are fragmentary sectional views illustrating semidiagrammatically successive steps involved in the method of the invention of locating and making an incision through the suprapubic region of a patient's abdominal wall and the anterior wall of the bladder, and of inserting a tubular viewing unit into the bladder through the incision;

FIGS. 6 and 7 are views similar to FIGS. 1 to 5, but illustrate the technique of the invention of fitting a telescope collar to the viewing unit and of inserting a telescope through the collar and the viewing unit;

FIG. 8 is a view similar to FIG. 6, but showing the telescope collar removed and showing the viewing unit sutured in place;

FIG. 9 is a view similar to FIG. 8, but showing a retention catheter inserted through the viewing unit into the bladder;

FIG. 10 is an enlarged, fragmentary sectional view of the distal end of an instrument for locating the incision and for inserting the viewing unit;

FIG. 11 is an enlarged isometric view showing one embodiment of the viewing unit in longitudinal section;

FIGS. 12 and 13 are fragmentary longitudinal sectional views of the proximal end of a tubular viewing unit of the invention equipped with alternative sealing means embodiments for maintaining a fluid tight seal with a retention catheter, for example;

FIG. 14 is a fragmentary isometric view of a combination viewing unit and insertion instrument of the invention wherein the distal end of the viewing unit is telescoped over the distal end of the insertion instrument with a closure tip of the insertion instrument removed;

FIG. 15 is a view similar to FIG. 14, but showing an insertion instrument having a different distal end.

DETAILED DESCRIPTION OF EXEMPLARY EMBODIMENTS OF INVENTION

Referring initially to FIGS. 1 and 10 of the drawings, illustrated therein is an instrument 20 which, as will be described, is used to locate a suprapubic incision and to insert a viewing unit 22, FIG. 11, therethrough. The instrument 20 comprises simply a rigid tube 24, of metal, plastic, or other suitable material, having a proximal end 26, a straight or substantially straight intermediate portion 28, and a curved distal portion 30 terminating in a distal end 32. The tube 24 is permanently closed adjacent its distal end 32 by a partition 34 which divides the interior of the tube into a socket 36 at its distal end and a longitudinal passage 38 extending from the partition to the proximal end 26 of the tube. The tube 24 is provided at the distal end of the passage 38 with one or more lateral openings 40. The socket 36 has telescoped thereinto a removable closure tip 42 which is externally tapered and rounded so that it may act as an obturator facilitating insertion through a patient's urethra as will be described hereinafter. In the construction illustrated, the removable tip 42 is shown simply as pressed into the socket 36. However, it may be threaded thereinto, or otherwise secured to the distal end 32 of the instrument 20. Also, the distal end of the instrument 20 may be equipped instead with any of the tips disclosed in my aforementioned copending application Ser. No. 26,727.

In the particular construction illustrated, the instrument 20 is of a diameter and a length suitable for use with female patients. However, it may be used with male patients by suitably modifying its length, diameter and curvature.

Considering the technique of the invention with which the instrument 20 is used, the tip 42 at the distal end 32 of the instrument is first inserted through the urethra 46 of a patient 48 into the patient's bladder 50, as illustrated in FIG. 1 of the drawings. Then, a suitable fluid, such as water, is introduced into the bladder 50 through the passage 38 and the lateral openings 40, in a quantity sufficient to inflate or distend the bladder, as shown throughout FIGS. 1 to 9 of the drawings. This may be accomplished readily by connecting a fluid source 52 to the proximal end 26 of the tube 24 by means of an elastomeric tube 54 equipped with a clamp 56. As will be apparent, fluid for distending the bladder 50 may be introduced by disengaging the clamp 56. When the bladder has been inflated to the proper degree, the clamp 56 is re-engaged with the elastomeric tube 54 to prevent further fluid introduction and to prevent reversed flow. It will be apparent that, in the foregoing operations, the instrument 20 functions as an urethral catheter.

Turning to FIG. 2, the next step is to bring the tip 42 of the instrument 20 into engagement with the anterior wall of the bladder with sufficient force to provide a visible external protrusion 60 in the suprapubic region 62 of the abdominal wall 64. This can be accomplished readily by suitable manipulation of the instrument 20 from adjacent its proximal end 26.

The visible external protrusion 60 produced by the foregoing manipulations locates the tip 42 of the instrument very accurately. Next, the physician, utilizing a scalpel 66, or other appropriate cutting instrument, makes a small incision 68, at the center of the protrusion 60, through the abdominal wall 64 and the anterior wall of the bladder 50. Normally, this incision need not be more than of the order of a few millimeters in length.

The incision 68, which is shown in FIGS. 3 to 9 of the drawings, is made while maintaining the tip 42 of the instrument 20 in pressural engagement with the anterior bladder wall. Consequently, when the incision 68 is sufficiently large, the tip 42 of the instrument 20 is automatically displaced outwardly through the incision. In practice, the tip 42 pops through the incision 68 automatically as soon as the incision is large enough. Thus, the instrument 20 acts as a trocar in performing this function.

In the embodiment of the invention presently under consideration, once the tip 42 of the instrument 20 has emerged through the incision 68, the tip 42 is removed, as shown in FIG. 3 of the drawings. However, with various of the instrument tips disclosed in my copending application Ser. No. 26,727, this is not necessary.

Next, as shown in FIG. 4, a reduced-diameter distal end 72 of the viewing unit 22, which is tubular, is inserted into in this particular embodiment the socket 36 in the distal end 32 of the instrument 20. Thus, the distal end 72 of the viewing unit 22 and the distal end 32 of the instrument 20 are telescopically connectible by insertion of the distal end 72 into the distal end 32.

As soon as the foregoing telescopic connection between the distal ends 32 and 72 of instrument 20 and the viewing unit 22 has been made externally of the body of the patient 48, the distal and intermediate portions of the viewing unit 22 are inserted through the incision 68 into the bladder 50, as shown in FIG. 5 of the drawings. It will be understood that such movement of the instrument and viewing unit combination may readily be carried out by concurrent movement of the physician's hands. In effect, the instrument and viewing unit combination 20 and 22 is threaded through the patient's body by the physician, with one hand on the instrument 20 and the other on the proximal end of the viewing unit 22. Thus, the instrument 20 serves as an insertion guide for the viewing unit 22.

Insertion of the viewing unit 22 through the incision 68 into the bladder 50 is limited by engagement of an external annular flange 74 on the proximal end of the viewing unit with the exterior of the patient's abdominal wall 64.

The next step is to disconnect the distal end 32 of the instrument 20 from the distal end 72 of the viewing unit 22, and to withdraw the instrument 20 from the bladder 50 and the urethra 46. The distal ends 32 and 72 of the instrument and the viewing unit 22 are only lightly engaged by the telescopic connection therebetween so that they can be disconnected within the bladder 50 readily by a slight pull on the instrument 20.

The interior of the tubular viewing unit 22 comprises a bore 80 adjacent the distal end of the viewing unit and a counterbore 82 extending from the bore 80 to the proximal end of the viewing unit. The diameter of the counterbore 82 is such as to permit telescopic insertion of a stop cock fitting 84, as shown in FIG. 6 of the drawings. The fitting 84 may be equipped with a stop cock 86, or the like, to which a source of fluid, such as water, may be connected if it is desired to introduce fluid into the bladder 50 at this stage, or during the subsequent viewing stage to be described.

As shown in FIG. 7, the next step in the technique of the invention is to insert a conventional telescope 88 through the fitting 84 and the viewing unit 22 into the bladder 50, the telescope making a sliding fit in the bore 80 at the distal end of the viewing unit. As will be apparent, with the telescope 80 installed as described, the physician may quickly and easily view the entire interior of the bladder 50. If desired, photographs may be taken through the telescope 88, or with an alternative telescope, not shown, substituted for the telescope 88.

After viewing of the interior of the bladder 50 in the manner described, the physician may decide to leave the tubular viewing unit 22 in place to permit viewing the bladder again at a later time. In this case, the viewing unit 22 may be secured in place by sutures 90, FIG. 8, extending through openings 92, FIG. 11, in the annular flange 74 and through adjacent portions of the patient's abdominal wall 64. The proximal end of the counterbore 82 may be closed by means of any suitable closure, not shown, to prevent urine leakage. It will be understood that the edges of the incision 68 grip the exterior of the viewing unit 22 sufficiently tightly to prevent urine leakage around the viewing unit.

Alternatively, if the use of a catheter is indicated, a suitable retention catheter, such as a Foley catheter 94, may be inserted into the bladder 50 through the tubular viewing unit 22, as shown in FIG. 9. As is conventional, the catheter 94 is provided with a portion 96 which may be inflated with air, or other gas, to retain the tip 98 of the catheter within the bladder 50. The catheter may be inserted with the assistance of a catheter probe, as is well known and as is disclosed in my aforementioned copending application.

To prevent urine leakage between the catheter 94 and the viewing unit 22, the proximal end of the viewing unit 22 is equipped with a sealing means 102, FIG. 12, or 104, FIG. 13, for providing a fluid tight seal between the catheter and the viewing unit. The sealing means 102 of FIG. 12 is simply an elastomeric plug pressed into the proximal end of the counterbore 82 and provided with a passage 106 of a size to accommodate and make a fluid tight seal with the catheter 94. The sealing means 104 of FIG. 13 is shown simply as comprising an elastomeric membrane fitting over the annular flange 74 of the viewing unit 22 and provided with an aperture 108 to receive and seal with the catheter.

In the embodiments of the invention thus far described, the combination of the insertion instrument 20 and the viewing unit 22 includes a telescopic connection for the distal ends 32 and 72 thereof which requires insertion of the distal end 72 of the viewing unit into the distal end 32 of the insertion instrument. This telescopic connection may be reversed by providing for insertion of the distal end 32 of the instrument 20 into the distal end of the viewing unit, as shown in FIGS. 14 and 15, and as will now be described.

The viewing unit shown in FIGS. 14 and 15 is quite similar to the viewing unit 22 and is designated generally by the numeral 122. It is provided therein with a counterbore 182 corresponding to the counterbore 82, and terminates at its proximal end in an external annular flange 174 corresponding to the flange 74 and equipped with suture openings 192. The principal difference is that the viewing unit 122 terminates at its distal end in a tapered, and preferably elastomeric, tip 200 of a size to receive therein the distal end 32 of the instrument 20 in telescopic sliding relation. As shown in FIG. 14, the viewing unit tip 200 may be telescoped over the distal end 32 of the instrument 20 with the tip 42 of the latter removed, although the tip 42 may be left in place also. Alternatively, as shown in FIG. 15, the distal end 32 of the instrument 20 may be open and have a slanted end face 204 and may be inserted into the tip 200 of the viewing unit 122 without removing any closure. As still other alternatives, the viewing unit tip may be telescoped into or over any of the instrument tips of my application Ser. No. 26,727. In all other respects, the combination of the instrument 20 and the viewing unit 122 operates in the same manner as the combination of the instrument 20 and the viewing unit 22.

Although exemplary embodiments of the present invention have been disclosed for purposes of illustration, it will be understood that various changes, modifications and substitutions may be incorporated in such embodiments without departing from the scope of the invention as defined by the claims appearing in the next section of this specification.

I claim as my invention:

1. A method of inserting a portion of a viewing unit into a body cavity, such as a hollow internal organ, through an incision in the wall of the cavity and the overlying part of the body, the interior of the cavity communicating with the exterior of the body through a body opening, said method being characterized by the use of an instrument having a distal end, and including the steps of:
    a. inserting the distal end of the instrument through the body opening into the interior of the cavity and into engagement with the wall of the cavity in register with the desired area of the exterior of the body;
    b. making an incision through the overlying part of the body and the wall of the cavity in register with the distal end of the instrument;
    c. displacing the distal end of the instrument outwardly through the incision;
    d. connecting a portion of the viewing unit to the distal end of the instrument;
    e. displacing the distal end of the instrument and a portion of the viewing unit into the interior of the cavity through the incision;
    f. disengaging the distal end of the instrument from the viewing unit within the cavity; and
    g. withdrawing the instrument from the cavity and the body opening, leaving a portion of the viewing unit within the cavity.

2. A method of inserting a portion of a viewing unit into the bladder, characterized by the use of an instrument having a curved distal portion terminating in a distal end, and including the steps of:
    a. inserting the distal end of the instrument through the urethra into the bladder and into engagement with the anterior wall of the bladder in register with the suprapubic area of the abdominal wall;
    b. making an incision through the abdominal wall and the anterior wall of the bladder in register with the distal end of the instrument;
    c. displacing the distal end of the instrument outwardly through the incision;
    d. connecting a portion of the viewing unit to the distal end of the instrument;
    e. displacing the distal end of the instrument and a portion of the viewing unit into the bladder through the incision; and
    f. withdrawing the instrument from the bladder and the urethra, leaving a portion of the viewing unit within the bladder.

3. A method as set forth in claim 2 characterized by the use of a viewing unit which is tubular, and including the additional step of inserting a telescope through the viewing unit into the bladder.

4. A method according to claim 3 including the further step of suturing the viewing unit to the suprapubic area of the abdominal wall.

5. A method as defined in claim 2 characterized by the use of a viewing unit which is tubular, and including the additional step of inserting a retention catheter through the viewing unit into the bladder.

6. A method as set forth in claim 5 including the further step of suturing the viewing unit to the suprapubic area of the abdominal wall.

* * * * *

PO-1050
(5/69)

UNITED STATES PATENT OFFICE
CERTIFICATE OF CORRECTION

Patent No. 3,656,485                    Dated  April 18, 1972

Inventor(s)  Dr. Jack R. Robertson

It is certified that error appears in the above-identified patent and that said Letters Patent are hereby corrected as shown below:

Abstract, line 26, after "Subsequently" insert --the distal end of the insertion instrument is disconnected from--

Column 2, line 42, "Serial No. 27,727" should be --Serial No. 26,727--

Signed and sealed this 24th day of October 1972.

(SEAL)
Attest:

EDWARD M. FLETCHER, JR.                    ROBERT GOTTSCHALK
Attesting Officer                          Commissioner of Patents